United States Patent [19]
Salmijak et al.

[11] 3,937,362
[45] Feb. 10, 1976

[54] LIQUID DOSAGE DEVICE HAVING ROTARY FEELER

[75] Inventors: Erich Salmijak, Solna; Eric Göransson, Stockholm, both of Sweden

[73] Assignee: Aktiebolaget Demektor, Hagersten, Sweden

[22] Filed: Sept. 13, 1973

[21] Appl. No.: 396,740

[30] Foreign Application Priority Data
Sept. 15, 1972 Sweden............................ 9294/72

[52] U.S. Cl. ............................................. 222/20
[51] Int. Cl.[2] ........................................ B67D 5/30
[58] Field of Search ............... 222/1, 22, 14–20, 222/40, 71, 25–28; 73/231 R, DIG. 11

[56] References Cited
UNITED STATES PATENTS

| 3,003,354 | 10/1961 | Wood | 73/231 R |
| 3,128,910 | 4/1964 | Calhoun | 220/20 |
| 3,680,378 | 8/1972 | Aurilio | 73/231 R |
| 3,792,611 | 2/1974 | Kozak | 73/231 R |

*Primary Examiner*—Stanley H. Tollberg
*Attorney, Agent, or Firm*—Holman & Stern

[57] ABSTRACT

The dosage of liquids in which an element is arranged to execute a rotating movement in a flow of liquids past the element and the element serves to alternately break a beam of light directed thereon so that the light impulses received thereupon are used via a feeler gauge and a valuation means to determine the liquid volume passing the element.

7 Claims, 5 Drawing Figures

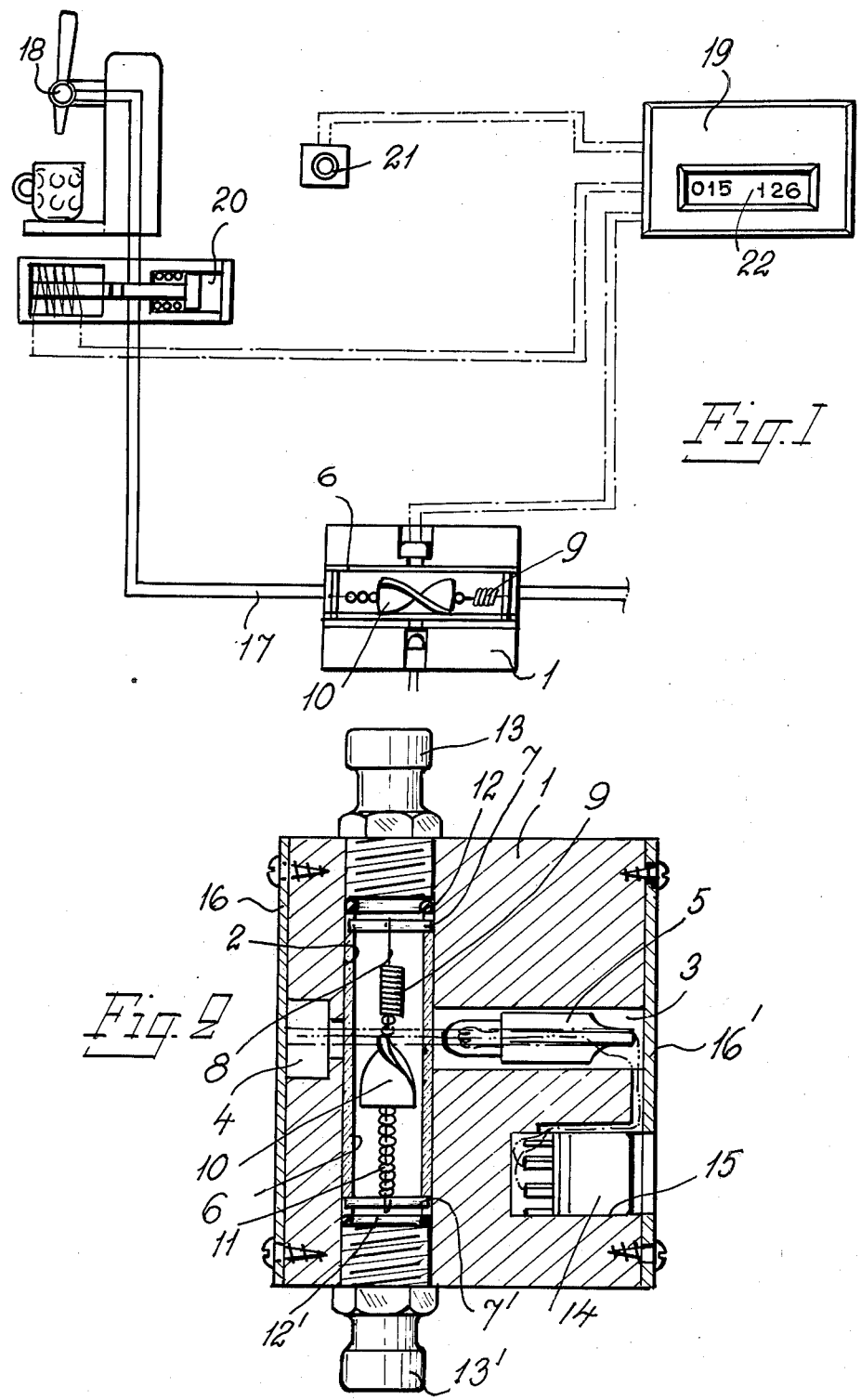

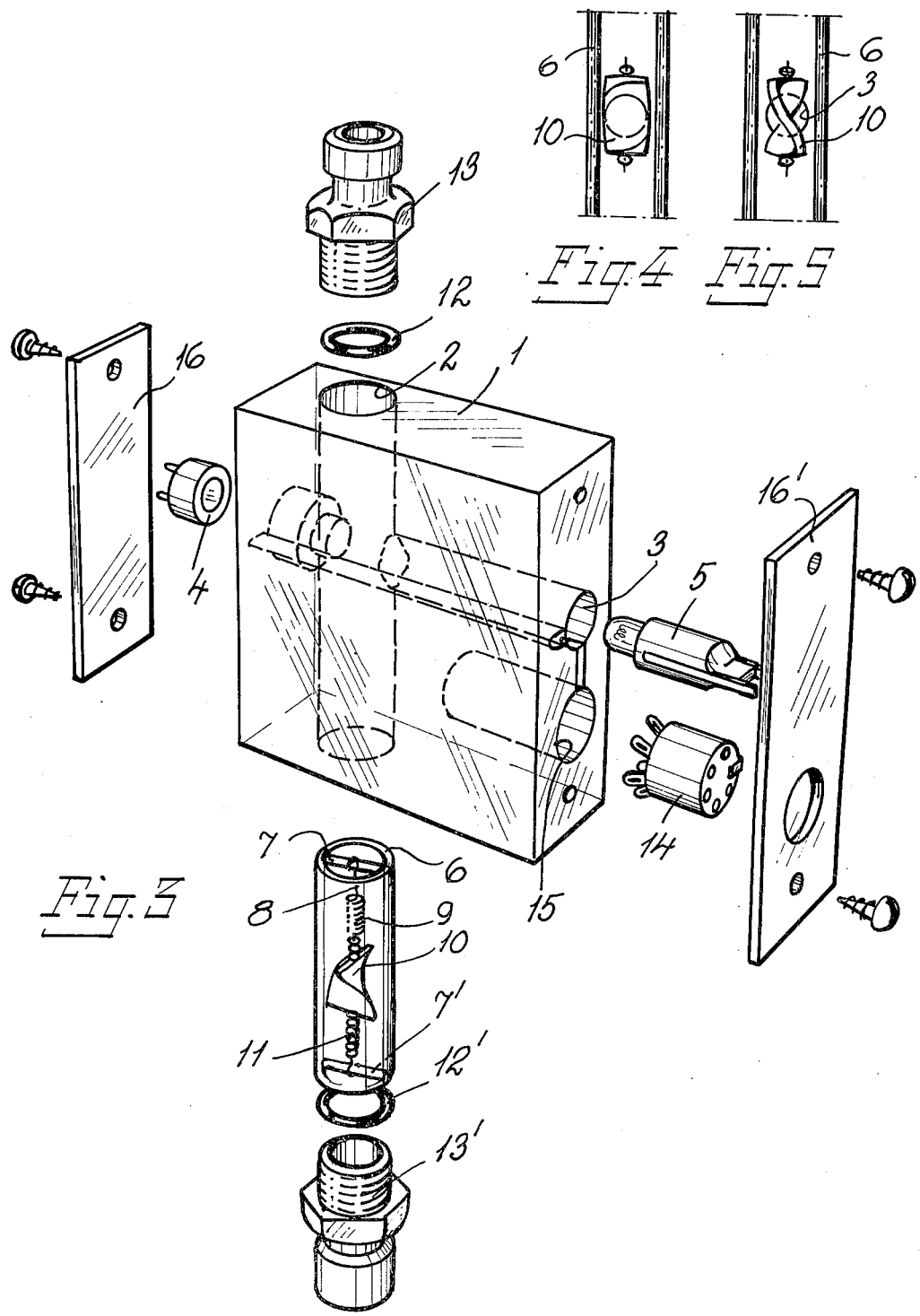

LIQUID DOSAGE DEVICE HAVING ROTARY FEELER

BACKGROUND OF THE INVENTION

This invention relates to a method for dosage of liquids, together with a device for the performing of the method.

Prior Art

A large number of devices and methods for dosage of liquids are known at the present time. As an example of earlier technology, one can mention the adoption of a rotatable feeler gauge, arranged in a line of pipe and mechanically connected to a registering device, which actuates a shut-off element after a predetermined number of rotary motions of the feeler gauge. The construction, however, is marred by considerable disadvantages, such as the problem of tightening caused by the mechanical connection to the feeler gauge, the need for space and the difficulties in servicing the device. Other constructions are also known, for example, with the utilization of a time-cycle, which, in conjunction with a valve, allows a flow for a predetermined length of time. Such a construction allows only a relative determination of volume without any great degree of accuracy.

OBJECT AND SUMMARY OF THE INVENTION

The object of this invention is to provide a method for the dosage of liquids and a device for the performing of the method, allowing an accurate registering of a flow of liquid in connection with dosage of the liquid in a predetermined volume, whereby the above-mentioned disadvantages of the earlier devices are eliminated entirely. With a device according to this invention, a volume of liquid can be measured accurately in connection with the flow of the liquid through a line of pipe, for example, in the measuring of drinks. According to the invention, the device is also extremely hygienic and no leakage problem can arise, the registering element being surrounded completely by the liquid without any mechanical contact through the pipe which encloses the liquid. An important advantage is also that the device is easily replaceable, in addition to which the gauge indicating the flow can easily be removed and replaced. Further advantages are the device's small volume together with a low production cost.

The method for dosage of liquids according to this invention is that an element is arranged to perform a rotating motion in a flow of liquid past the element, and also that the element is arranged alternately to break a beam of light, which is directed on the element, at which the light impulses received from the element through the feeler gauge and valuation element can be used to determine the volume of liquid passing the rotatably arranged element.

The device for dosage of liquids according to the method in this invention comprises a device arranged to rotate freely, designed to be driven by a flow of liquid through a channel in which the device is arranged, and in which a source of light is arranged to direct light on the rotatable device, which is constructed to alternately break the beam of light from the source of light, at the same time as which a light sensitive device of a semi-conductor type is arranged in line with the source of light on the opposite side of the rotatable device, whereby the number of light impulses formed on the rotation of the rotatable device constitutes a measurement of the volume of liquid having passed through the rotatable device.

The device for dosage of liquids according to this invention is that the rotatable device is enclosed in a transparent, pipe-shaped portion, which is movably arranged in a through channel, which is shaped in a surrounding light, and an element is also in the respective opening of the channel, being designed to fix the pipe-shaped portion in a predetermined position, and at the same time allowing connection of supply pipes and outlet pipes for the liquid medium.

The method according to this invention and the performing of the device according to this invention shall now be described in greater detail by way of the accompanying drawings.

BRIEF DESCRIPTION OF THE DRAWINGS

FIG. 1 shows a schematic functional view of the device according to the invention arranged for the measuring of draught beer, FIG. 2 shows a cross-section of the device according to this invention, FIG. 3 shows an exploded perspective view of the device according to this invention with the parts separated from each other, FIG. 4 shows a view of the rotatable feeler gauge in a position in which the beam of light is broken, and FIG. 5 shows a view corresponding to FIG. 4, in which the rotatable element is in a second position, allowing for the passage of light.

DETAILED DESCRIPTION OF THE INVENTION

FIG. 1 indicates a casing through which a through channel 2 with a cylindrical cross-section is arranged vertically. A second cylindrical channel 3 is arranged normal to the channel 2, whereby the second channel's longitudinal axis is arranged to cut the first channel's longitudinal axis. One free part of the second channel 3 is connected to the first channel 2, designed to allow the introduction of a semi-conductor element 4 sensitive to light, for example, a light sensitive resistance. In the other free part of the channel 3, a source of light 5 is arranged consisting of a filament in a socket. In the first channel 2, a transparent pipe 6 is arranged at its respective ends with a fixing-element 7,7', on which a centrally located axle 8 is arranged. As shown, one end of the axle 8 is defined by a coil resilient 9, which allows a spring fixing of the axle 8 against the fixing element 7,7'. A feeler gauge 10 is rotatably arranged around the axle 8, and the gauge 10 is fixed in the line of the axle by a number of balls 11 surrounding the axle 8. The feeler gauge is constructed as a screw-shaped portion, and in cross-section is essentially rectangular with the edge portions in a vertical direction from one another and arranged at right-angles to one another. The free end portions of the transparent pipe-shaped part 6 bears O-rings 12,12' which, with its sides turned away from the pipe-shaped part 6, bears on inlet plugs 13,13' respectively, fastened in a thread provided in the casing 1. The inlet plugs 13, 13' are preferably of the bayonet coupling type. In the casing 1, a number of other channels are provided, designed to allow the leading through of wires from the light-sensitive semi-conductor element 4 and the source of light 5, to a contact device 14, arranged in a cylindrical blind hole 15, formed in the casing 1. Two gables or plates 16,16' are fixably arranged against the casing 1, whereby both the light-sensitive semi-conductor element 4 and the source of light 5 are completely protected from external effects.

According to this invention, the device is connected to a line of pipe 17, through which the liquid flows for dosage. FIG. 1 shows the device connected to a line of pipe leading to a tap 18 for beer, for example. When the tap 18 is actuated, the liquid flows through the line of pipe 17, whereby the feeler gauge 10 is caused to rotate. At this, rotation the beam of light from the source of light 5 is broken twice per revolution of the feeler gauge 10, which is sensed by the light sensitive semi-conductor element. The impulses from the element 4 are sensed by a counting device 19 of known type, releasing a magnetic valve 20, after a predetermined number of impulses. The counting device 19 can, furthermore, be arranged so as to allow the counting of pulse trains of varying predetermined length, which can be set by means of a preselective device 21. Here it is clearly suitable to arrange comtometer 22 to the counting device 19, being separated from one another, whereby direct reading of the number of dosed volumes of liquid can occur with regard to differing volumes. This must be considered a special advantage in, for example, portioning out of beer, normally occurring in large as well as small glasses.

One special advantage of the device according to this invention is that it can easily be changed for servicing. This can be accomplished by removing the line of pipe 17 from the bayonet coupling 13,13', and removing the wires connecting the counting device 19 with the contact device 14. If the feeler gauge needs replacing, this replacement can easily be done by removing the bayonet couplings or the inlet plugs, 13,13', after which the pipe 6 with the feeler gauge 10 can easily be pushed out of the vertical channel 2. A new pipe 6 can then easily be pushed back into the channel, after which the plugs 13,13' are refitted to the casing 1, so that the device is ready for use again. It is also apparent that both the source of light 5 and the light sensitive semi-conductor can easily be removed and replaced by removing the gables or plates 16,16'.

It should be emphasized that the device and the method according to this invention are in no way limited to the performance described and indicated. The device can naturally be easily adapted for use in many other fields of application for the measuring and dosage of liquids. The above-described performance indicated in the drawings is only intended to serve as a suitable mode of performance, which can naturally be modified within the framework of the invention.

What we claim is:

1. A device for the dosage of liquids and more particularly for the measurement of beer, comprising a casing having first and second through channels therein, said channels being arranged at right-angles to and crossing each other, said first channel being of uniform cross-section throughout the length thereof, a fixing means adjacent each end of the first channel, an axle extending centrally of the first channel and secured to the fixing means, means providing a flow of liquid through the first channel, a feeler element positioned in the first channel and arranged on the axle for free rotary movement and driven by the liquid flow through the first channel, a light source located in the second channel on one side of the first channel, a light sensitive element of semi-conductor type located in the second channel on the other side of the first channel in line with the light source, the feeler element serving to alternately break a beam of light from the light source, and the axis of the light source and the axis of the feeler element being in correspondence, so that the number of light impulses emitted on rotation of the feeler element constitutes a measurement of the volume of light having passed the feeler element.

2. The device as claimed in claim 1 in which the feeler element is defined by a spiral-shaped part of rectangular cross-section having end edges, the end edges being directed away from one another and separated at least 90° from one another.

3. The device is claimed in claim 1 including a contact device within the casing and means operably connecting the light source and light sensitive element to the contact device.

4. The device as claimed in claim 1 including a transparent pipe removably mounted within the first channel, and said fixing means being located at each end of the pipe.

5. A device for the dosage of liquids and more particularly for the measurement of beer, comprising a casing having first and second through channels therein, said channels being arranged at right angles to and crossing each other, means providing a flow of liquid through the first channel, a feeler element positioned in the first channel for free rotary movement and capable of being driven by the liquid flow through the first channel, a light source located in the second channel on one side of the first channel, a light sensitive element of semi-conductor type located in the second channel on the other side of the first channel in line with the light source, the feeler element serving to alternately break a beam of light from the light source, the axis of the light source and the axis of the feeler element being in correspondence, so that the number of light impulses emitted on rotation of the feeler element constitutes a measurement of the volume of liquid having passed the feeler element, a transparent pipe within the first channel, an axle centrally located in the transparent pipe, a fixing means at each end of the transparent pipe to which the axle is attached, the feeler element being arranged on the axle, and one end of the axle being defined by a spiral coil allowing a resilient connection between the axle and the fixing means to which the axis is attached.

6. The device is claimed in claim 5 in which the feeler element is fixed in a pre-determined axial position by a plurality of balls surrounding the axle at the end opposite the spiral coil.

7. The device as claimed in claim 1 including a counting means and a control valve for the means providing a flow of liquid through the first channel, the counting means being operably connected to the light sensitive element and the control valve for actuating the control valve after receiving an impulse train of predetermined length, with the control valve arresting flow of liquid through the first channel, a selector device operably connected to the counting means for allowing the setting of the counting means for the counting of impulse trains with at least two lengths being separated from one another, whereby volumes of liquids in different dosages are obtained, the counting means being arranged with a number of comptometers corresponding to the possible setting of the selector device, with the comptometers allowing direct reading of the number of dosed volumes of liquid with regard to volume sizes.

* * * * *